Oct. 3, 1944.   R. I. ROTH   2,359,680
DATA REPRODUCING MACHINE
Filed May 31, 1941   10 Sheets-Sheet 1

INVENTOR.
BY Robert I. Roth
ATTORNEY.

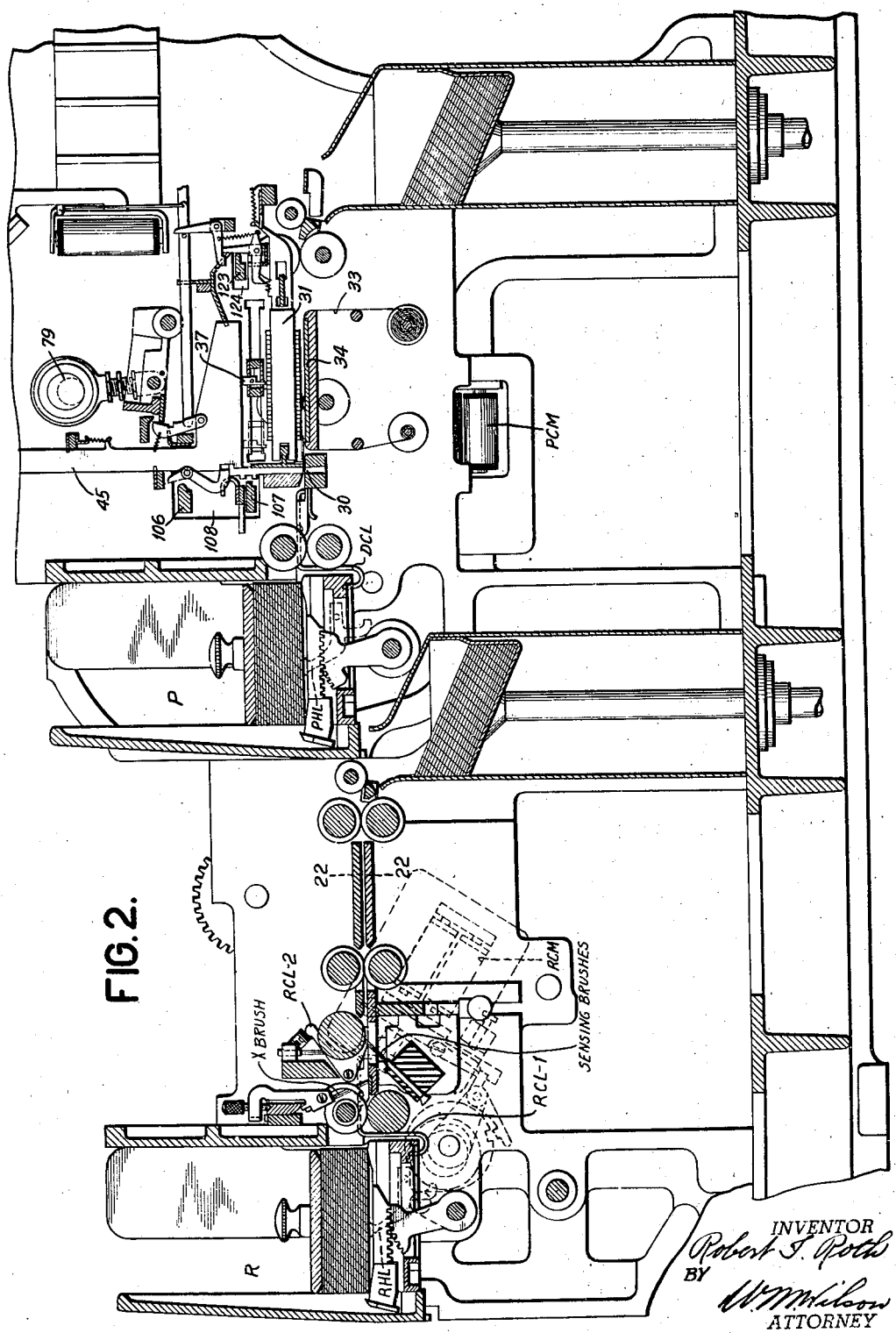

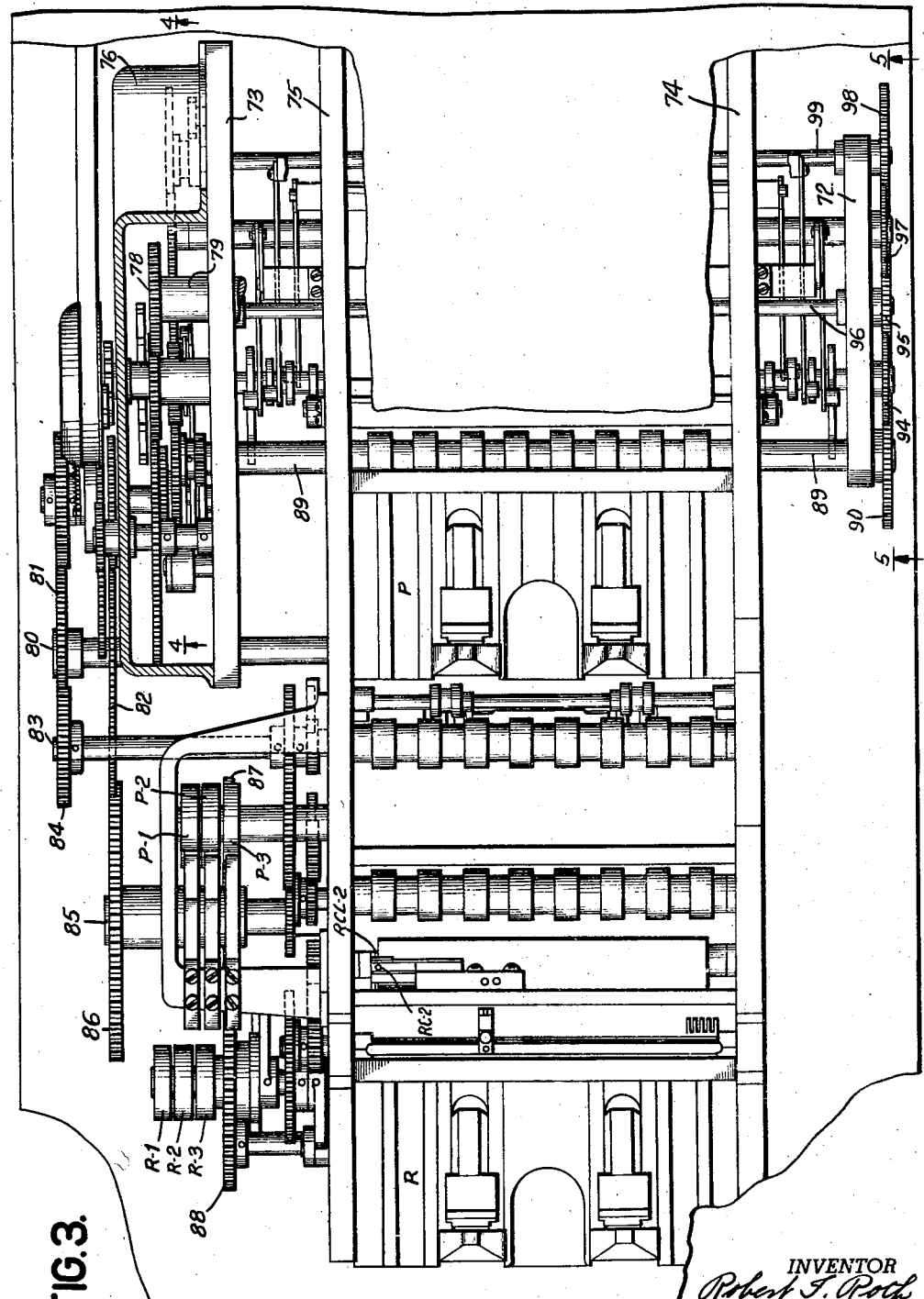

Oct. 3, 1944.   R. I. ROTH   2,359,680
DATA REPRODUCING MACHINE
Filed May 31, 1941    10 Sheets-Sheet 4
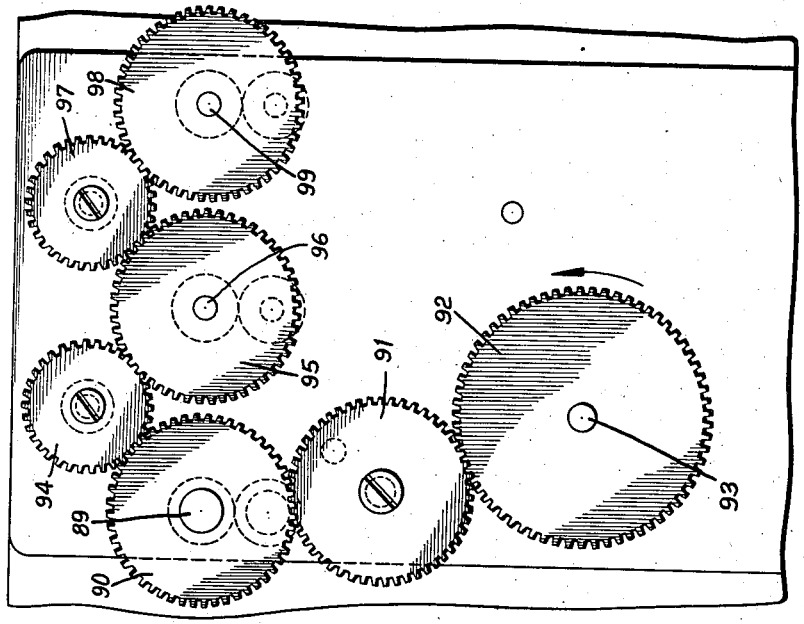
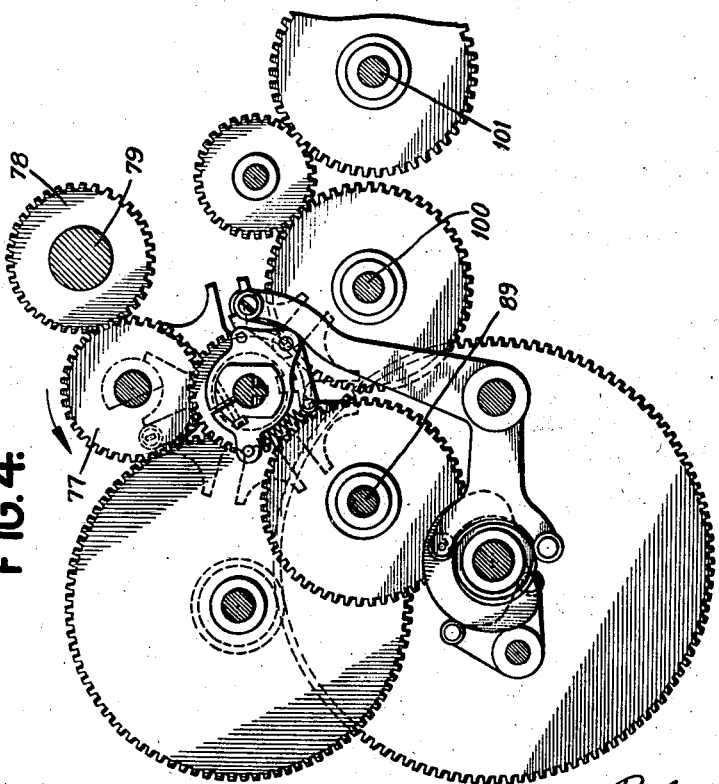
INVENTOR,
Robert I. Roth
BY
ATTORNEY.

Oct. 3, 1944.       R. I. ROTH       2,359,680
DATA REPRODUCING MACHINE
Filed May 31, 1941         10 Sheets-Sheet 5
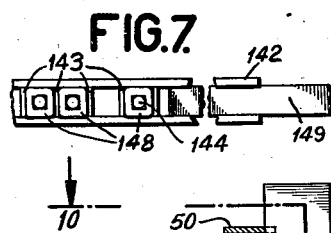
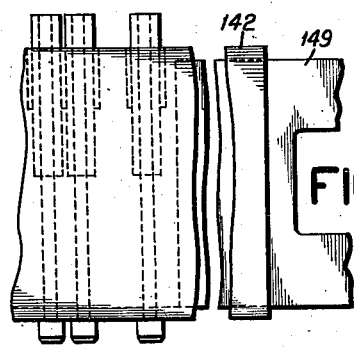
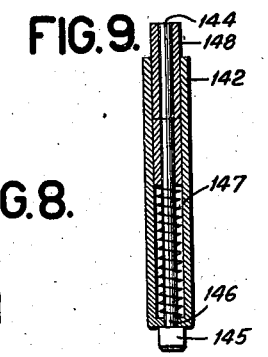
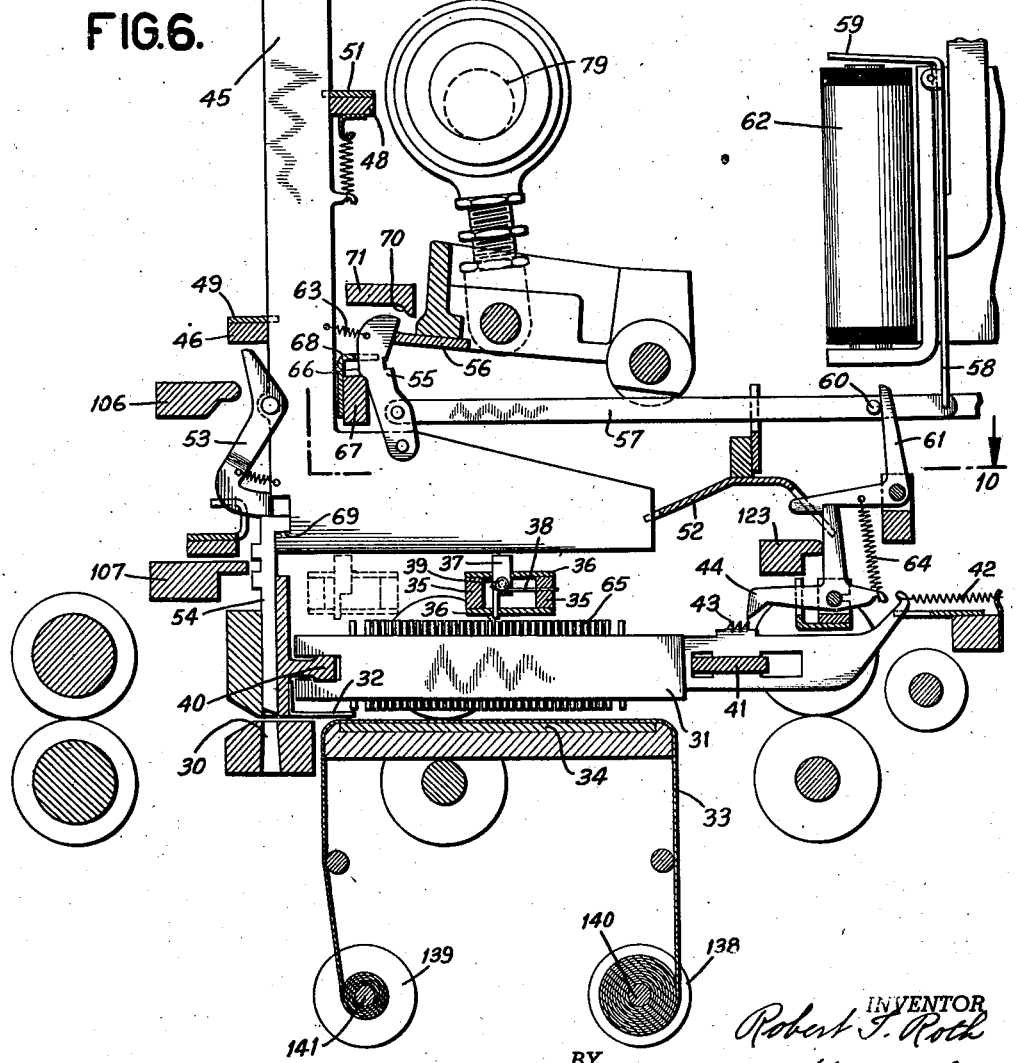
INVENTOR
Robert I. Roth
BY
ATTORNEY

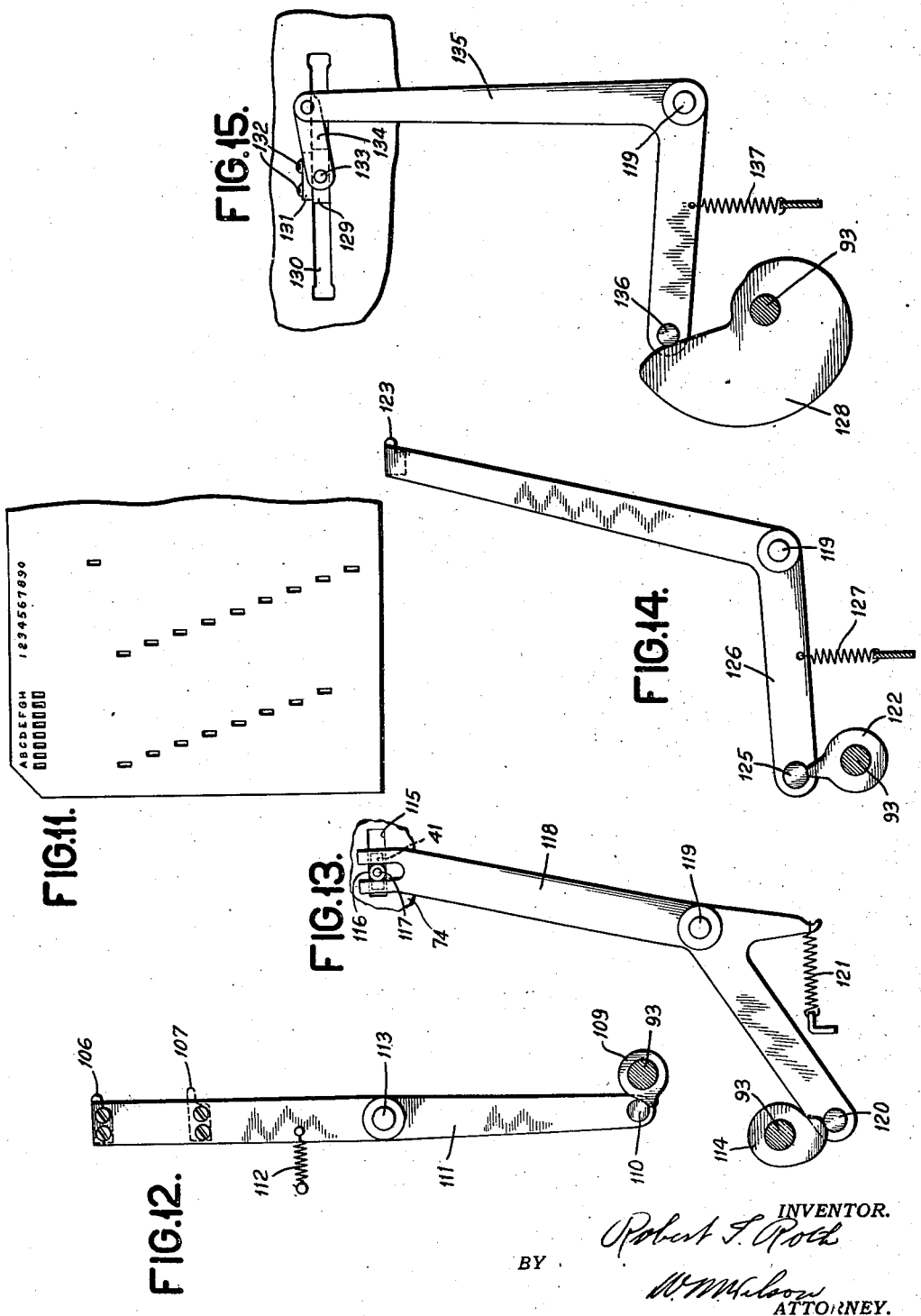

Oct. 3, 1944.  R. I. ROTH  2,359,680
DATA REPRODUCING MACHINE
Filed May 31, 1941  10 Sheets-Sheet 9

INVENTOR.
Robert I. Roth
BY
ATTORNEY.

Oct. 3, 1944.　　　　　R. I. ROTH　　　　　2,359,680
DATA REPRODUCING MACHINE
Filed May 31, 1941　　　10 Sheets-Sheet 10

INVENTOR.
Robert I. Roth
BY
ATTORNEY.

Patented Oct. 3, 1944

2,359,680

UNITED STATES PATENT OFFICE 2,359,680

DATA REPRODUCING MACHINE

Robert I. Roth, Valley Stream, N. Y., assignor to International Business Machines Corporation, New York, N. Y., a corporation of New York Application May 31, 1941, Serial No. 395,935

17 Claims. (Cl. 101—19)

This invention relates to improvements in perforating machines wherein record cards are perforated, and printed upon in agreement with such perforations, the operations of perforating and printing being simultaneous and under control of other perforated or pattern cards.

In particular, this invention relates to a machine such as disclosed in U. S. Patent No. 2,032,805 wherein record cards are perforated under control of other perforated or pattern cards.

It is well understood in the art, as in the patent reference given, that perforated record cards can be fed individually and successively past a sensing station by suitable means and the numerical or alphabetical designations contained therein interpreted to cause cooperative mechanisms to perforate other cards in a like manner, the other cards being fed in synchronism with the first. It is further well known that by feeding record cards in a like manner past other sensing devices such record card designations can be sensed to actuate mechanism to print thereon the interpreted information recorded by the designated perforations.

It is furthermore obvious that record cards could be prepared by a combination of the methods of the operations just described such that printing and perforating upon a record card would be accomplished under control of another perforated or pattern card. However, such a combination method would present difficulties such as prolonged preparation time, dual operations, unreliability of sequence, additional manual handling, duplication of feeding, and similar obstacles. Furthermore, such a combination method would require duplicate mechanisms or machines, thereby adding materially to the cost of preparing record cards in the manner desired.

It is, accordingly, an object of this invention to provide an improved perforating and printing machine in which punching and printing of a designation in a record card is effected simultaneously under control of a perforated designation in another record card.

A further object is to provide a perforating and printing machine in which perforating and printing of designations are effected simultaneously in a plurality of columns of a work sheet, the actuating means for the perforating and printing being common.

Another object of this invention is to provide a novel printing mechanism in which the printing elements are caused to be actuated during the intermittent pauses of a work sheet as it is fed, the line of resulting print being invariable.

Another object of this invention is to provide a machine in which improved means are provided to distinguish between a combination of two perforations in a specific column and a single perforation in the same column of the same identity as one of the combination.

Another object of this invention is to provide a machine in which perforations are made in a variable line in a work sheet over a plurality of columns, simultaneous printing being made in an invariable line in the same work sheet over a plurality of columns, and the control for both perforating and printing being furnished from perforated designations in a variable line over a plurality of columns of another work sheet fed in synchronism with the first.

A still further object is to provide, in a machine which interpretively reproduces perforations and printing into a record card from and under the control of perforations in a pattern card, a means for withholding the printing of the record card until the second of a combination of two perforations in a specific column of the pattern card is sensed.

A still further object of this invention is to provide, in a machine which interpretively reproduces printing and perforations into a record card from and under the control of perforations in a pattern card, a means for withholding the perforating of the record card under certain conditions of perforation in a specific column of the pattern card.

Another object is to provide a perforating and printing machine wherein a single impulse received by a common control means is utilized to effect the perforating and printing operations.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a sectional elevation view of the machine showing the feeding, sensing, perforating, and printing stations.

Fig. 3 is a plan view of the machine.

Fig. 4 is a sectional elevation view along line 4—4 in Fig. 3 and shows a part of the driving mechanism including the Geneva step motion gear.

Fig. 5 is partial side elevation view along the line 5—5 in Fig. 3, and shows the drive to the various shafts and the feed rolls.

Fig. 6 is a detail view showing the punching, printing, and associated mechanism.

Figs. 7, 8, and 9 show enlarged views of the type bar construction.

Figure 10:
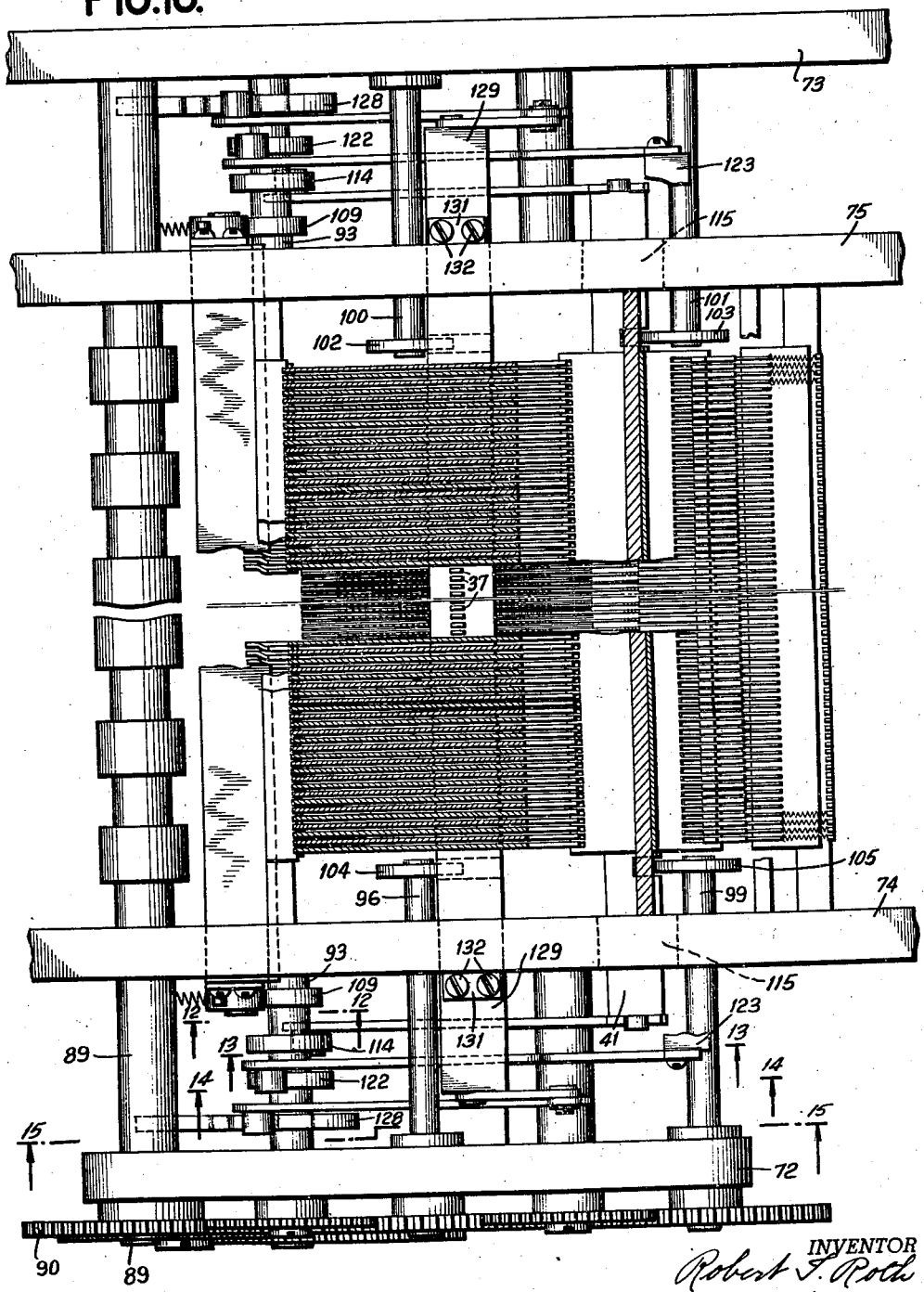

Fig. 10 is a plan view of Fig. 6 along the line 10—10.

Fig. 11 is a partial view of a record card as prepared by this machine.

Fig. 12 is a detail view along the line 12—12 of Fig. 10, and shows the punch disabling cam and mechanism.

Fig. 13 is a detail view along the line 13—13 of Fig. 10, and shows the zoning bail cam and mechanism.

Fig. 14 is a detail view along the line 14—14 of Fig. 10, and shows the stop pawl restoring bail cam and mechanism.

Fig. 15 is a detail view along the line 15—15 of Fig. 10, and shows the printing interposer bail cam and mechanism.

Figure 16:
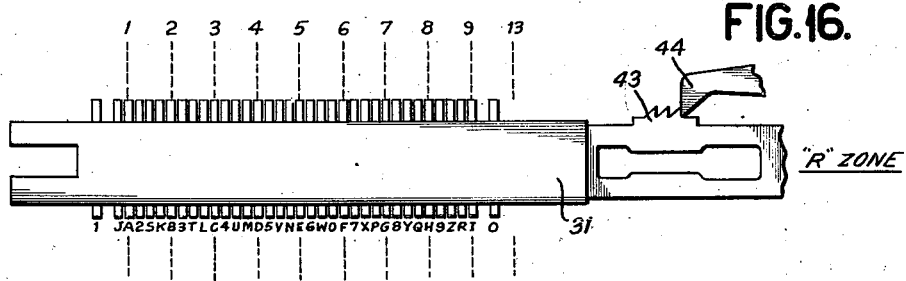

Fig. 16 is a detail view showing a type bar in the "R" zone.

Figure 17:
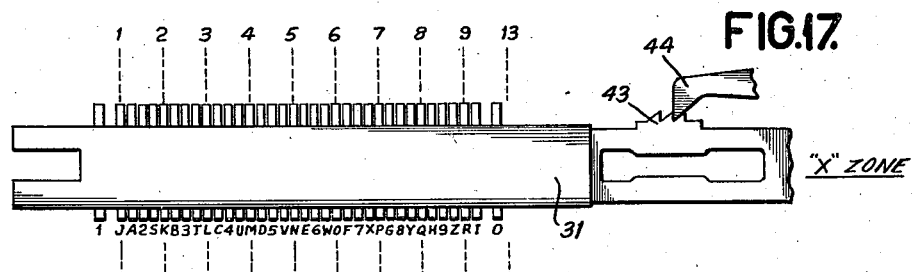

Fig. 17 is a detail view showing a type bar in the "X" zone.

Figure 18:
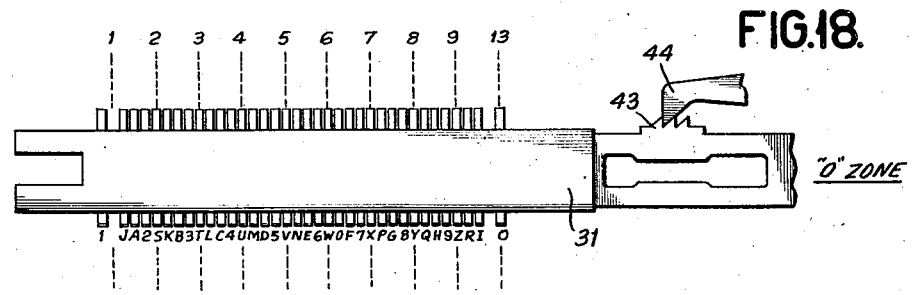

Fig. 18 is a detail view showing a type bar in the "0" zone.

Figure 19:
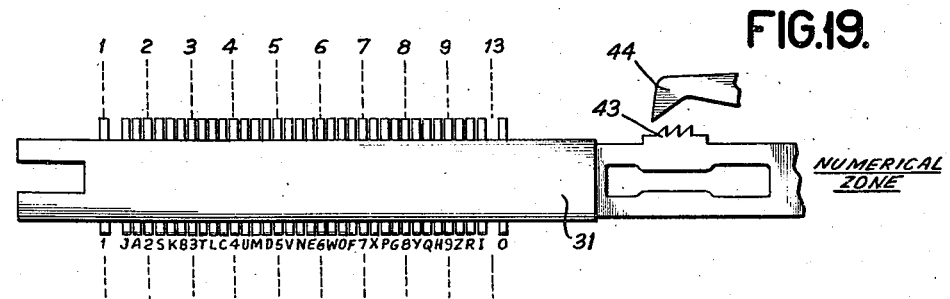

Fig. 19 is a detail view showing a type bar at its full limit of travel in the "numerical" zone.

Figure 20:
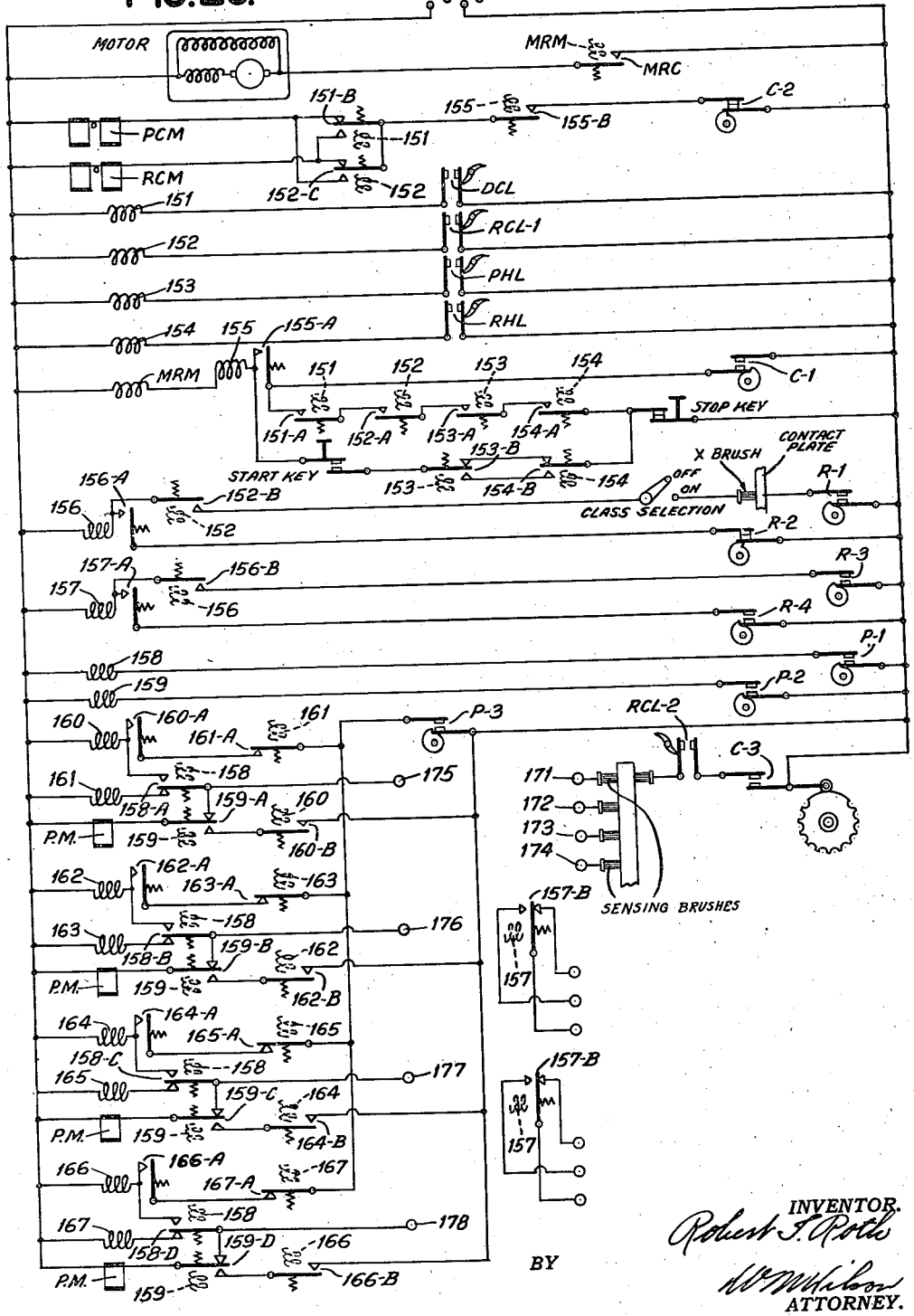

Fig. 20 is the wiring diagram of the electrical circuits of the machine.

Figure 21:
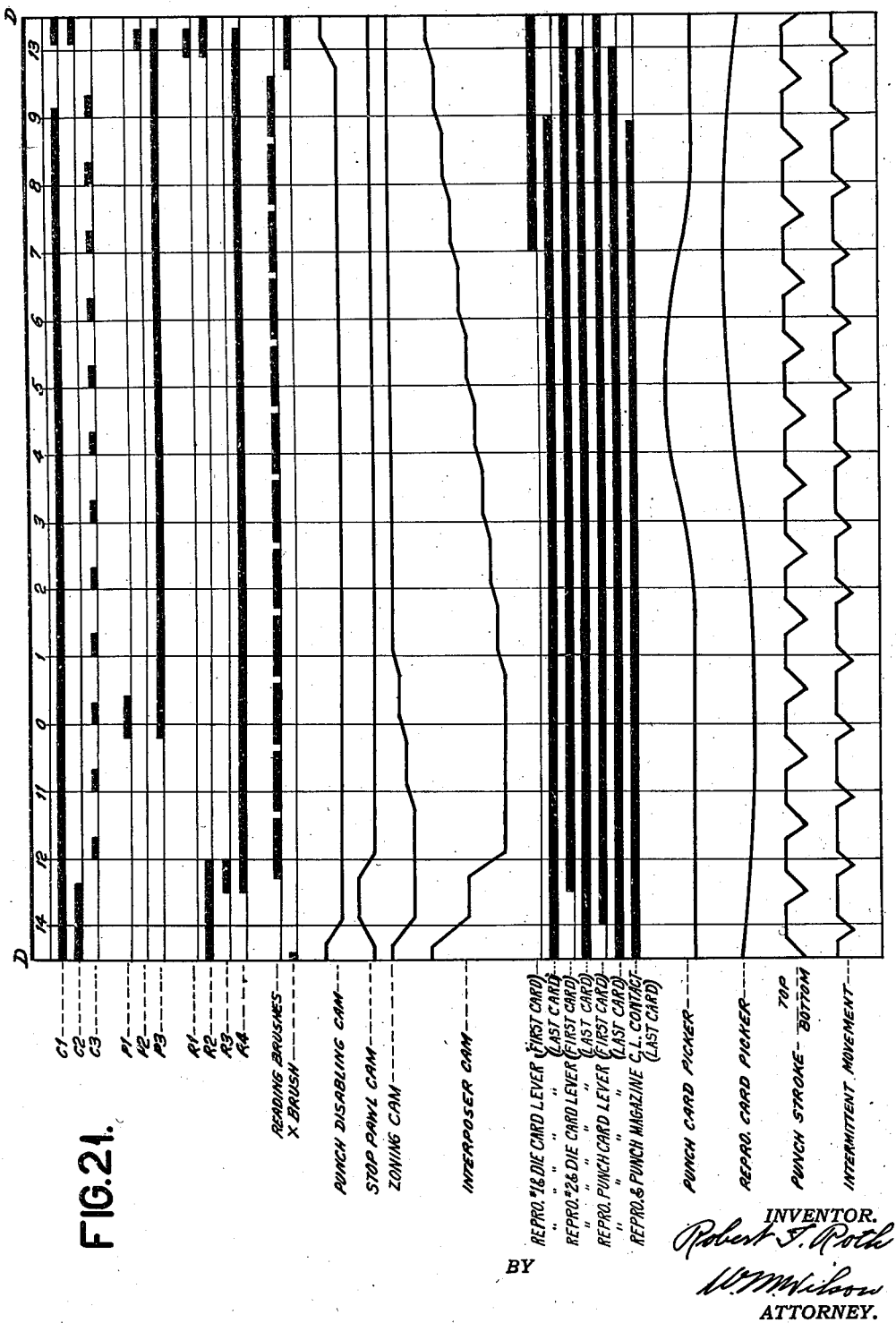

Fig. 21 is the timing chart of the various coordinating parts of the machine in cyclic operation.

While the instant invention is intended to be more than a mere improvement in the previously mentioned U. S. Patent No. 2,032,805, the embodiment herein disclosed follows to some extent the structure of the latter patent. In Fig. 2, for example, the card reading unit has been adapted from a similar card reading unit shown in Fig. 3 of the above noted patent. However, the reading unit herein disclosed has been somewhat simplified as can be determined from a comparison of the Fig. 2 of the instant invention and Fig. 3 of Patent No. 2,032,805 from which the contact roll 281, the brushes 16, the brush holder 153, and the card levers CHC and CHCL have been omitted. These components normally would occupy the line 22—22 as shown in Fig. 2 of the present invention.

The punching unit as disclosed in Patent No. 2,032,805 has also been simplified to the extent of omitting certain of the feed rolls in part and the omission of the contact roll 227, the brushes 19, the card lever PCL, and the brush holder 171 as shown in Fig. 3 of the recited patent.

Other of the drawings as herein shown follow along the lines of the structural disclosure of Patent No. 2,032,805.

It is not the intent, however, in the present invention to be limited by the structure of the embodiment shown, but the purpose of the single modification shown by adaptation to the structure of the aforesaid patent is to readily distinguish the novelty of the present invention over what is old in the prior art.

Referring to Figs. 2 and 6, the operation of this invention can be best understood by following the coordinated progress of pattern cards through the reading unit and blank cards through the punching unit. Pattern cards are placed in the sensing magazine R, and blank cards are placed in the punch-print magazine P, see Fig. 2. The pattern cards are fed from the sensing magazine R, past the X-brush, and past the sensing brushes where perforated designations in the pattern cards are sensed to electrically furnish impulses to the corresponding punch magnets in the punch-print unit. The pattern cards are then fed by feed rolls into a hopper. The pattern cards are fed and advanced with uniform motion. The blank cards are fed from the punch-print magazine P, past the die and stripper 30 with intermittent motion furnished by a Geneva gear mechanism, in synchronism with the pattern cards. As the blank cards pass under the die and stripper 30, they are perforated to correspond with the pattern card by the punches 54 (see Fig. 6). As previously pointed out the punch magnets receive impulses from the sensing brushes. There is a punch magnet for each sensing brush, and each punch magnet in turn controls a distinct and corresponding punch. The operation and the mechanisms which control such operation up to this point, are identical with those disclosed in U. S. Patent No. 2,032,805. (Note: For purposes of clarity, blank cards, after being perforated, will be referred to as "record cards" throughout the present description.)

As the record card leaves the die 30 (see Fig. 6), it travels under a plurality of type bars 31, there being one type bar for each columnar position of the record card. A guide 32 directs the leading edge of the record card under the type bars 31. Underneath the card is a ribbon 33 which lies on the top of the rubber platen 34. Above the type bars 31 is a bail assembly composed of the two side pieces 35 and the top and bottom pieces 36. Mounted for vertical reciprocation motion in the pieces 36 are a plurality of printing interposers 37, one for each type bar. A spring 38 acts against a stud 39 on each interposer to normally keep the interposers 37 up, determined by the stud 39 abutting the top piece 36. The bail assembly is so mounted in the machine that it can move from left to right in synchronism with the card. At the end of a card cycle it is quickly restored to the left as shown by the dotted lines in Fig. 6. The type bars 31 are supported on extensions of the stripper 40 and at the other ends by the bail 41. A spring 42 acts to keep the type bar 31 in contact with bail 41. On the top edge of the type bar 31 are the teeth 43 which cooperate with the stop pawl 44 to stop the type bar in the proper zoned position.

Above the printing interposers 37 are the slides 45, one for each type bar (Fig. 6). The slides are guided in their vertical reciprocating motion by the bars 46, 47, and 48 and are separated from each other by the combs 49, 50, 51, and 52. Pivoted to each slide 45 is the piece 53, the lower end of which rides on the top of punch 54. Also pivoted to each slide 45 is the interposer 55, in which the notch cooperates with the bail 56 in a manner as described in Patent No. 2,032,805. Pivoted to the interposer 55 is the call link 57, the right end of which is pivoted to an extension 58 of the punch magnet armature 59. A stud 60 on the call link 57 cooperates with the latch 61, to release the stop pawl 44.

The actions of punching and printing are as follows:

The record card passes the die 30 with the "12" position leading. For example, if a "12" is to be punched in the card, the punch magnet 62 is energized at "12" on the machine index as shown by the time chart of Fig. 21. The call link 57 moves to the right against the action of spring 63, and the stud 60 rocks the latch 61 clockwise allowing the stop pawl 44 to be urged counter-clockwise by spring 64 into engagement with type bar 31. The type bar will now be stopped in the position shown in Fig. 16. The call link 57 moving to the right causes interposer 55 to engage the bail 56 so that on its downward movement, it carries the slide 45 with it. The piece 53 being on top of the punch 54 carries the punch downwards forcing it through the card. At this time the printing interposer 37 will be at the extreme left (see dotted lines Fig. 6) and as it is forced down will clear all of the type on the type bar 31. A cam face 66 on the interposer 55 cooperates with a bar 67 to hold the notch in the interposer 55 in engagement with the bail 56. A comb 68 positions the interposers 55. On the upstroke of bail 56, a ledge 69 retracts the punch 54. The interposer 55 is also cammed away from the bail 56 by the camming surface 70 of bar 71.

The timing chart, Fig. 21, will show that the printing interposer is held at its extreme left position at the time "12," "11" and "zero" holes are punched. The reason for this is that the type bar is zoned from the "12," "11," and "zero" impulses to the punch magnet 62 and no printing should occur at those times. The zoning bail 41 moves slightly to the right as the "11" position moves under the punches 54. If the punch magnet received an impulse at "11" the type bar would be stopped by the stop pawl 44 in the position shown in Fig. 17. The bail 41 again moves slightly to the right as the "zero" position is brought under the punches 54, and an impulse at "zero" would zone the type bar as in Fig. 18. As the "1" position moves under the punches, the bail 41 moves fully to the right and the type bar 31 will be positioned as in Fig. 19 or in the numerical zone.

In the example previously discussed, it is assumed that a "12" was punched in the card and that the type bar 31 is stopped as in Fig. 16. The type bar is retained in this position for the remainder of the cycle by the stop pawl 44. Further movement of bail 41 to the right merely causes it to move away from the abutting surface of the type bar 31. As previously mentioned the printing interposer 37 is at the extreme left (dotted as shown in Fig. 6) during the "12," "11," and "zero" times on the machine index. Now, however, as the "1" position on the record card is brought under the punch 54, the printing interposer 37 moves to the right in synchronism with the card and is in the position indicated by dotted line "1" of Fig. 16. If a "1" is now punched in the same column of the card as the "12" already punched, the column will contain a "12" and a "1" which corresponds to the alphabetical character "A." Fig. 16 will show that if the printing interposer 37 (see Fig. 6) is carried down by the slide 45 at the "1" time on the index, the letter "A" will be printed upon the card. From the "1" position to the "13" position on the index, the printing interposer 37 moves in synchronism with the record card to print the proper character.

It is impossible to print a "zero" at the "zero" time in the cycle as the "zero" impulse is used for zoning. If a "zero" is punched, the type bar will be positioned in the "0" zone (see Fig. 18). If there is no other punching in combination with the "zero" punching for a specific column in the card, the machine senses this fact and causes the "zero" to be printed at "13" time on the machine index. For this reason a "zero" type has been provided in the type bar which can be utilized at the "13" time on the index. This will be discussed later in detail.

Figure 1:
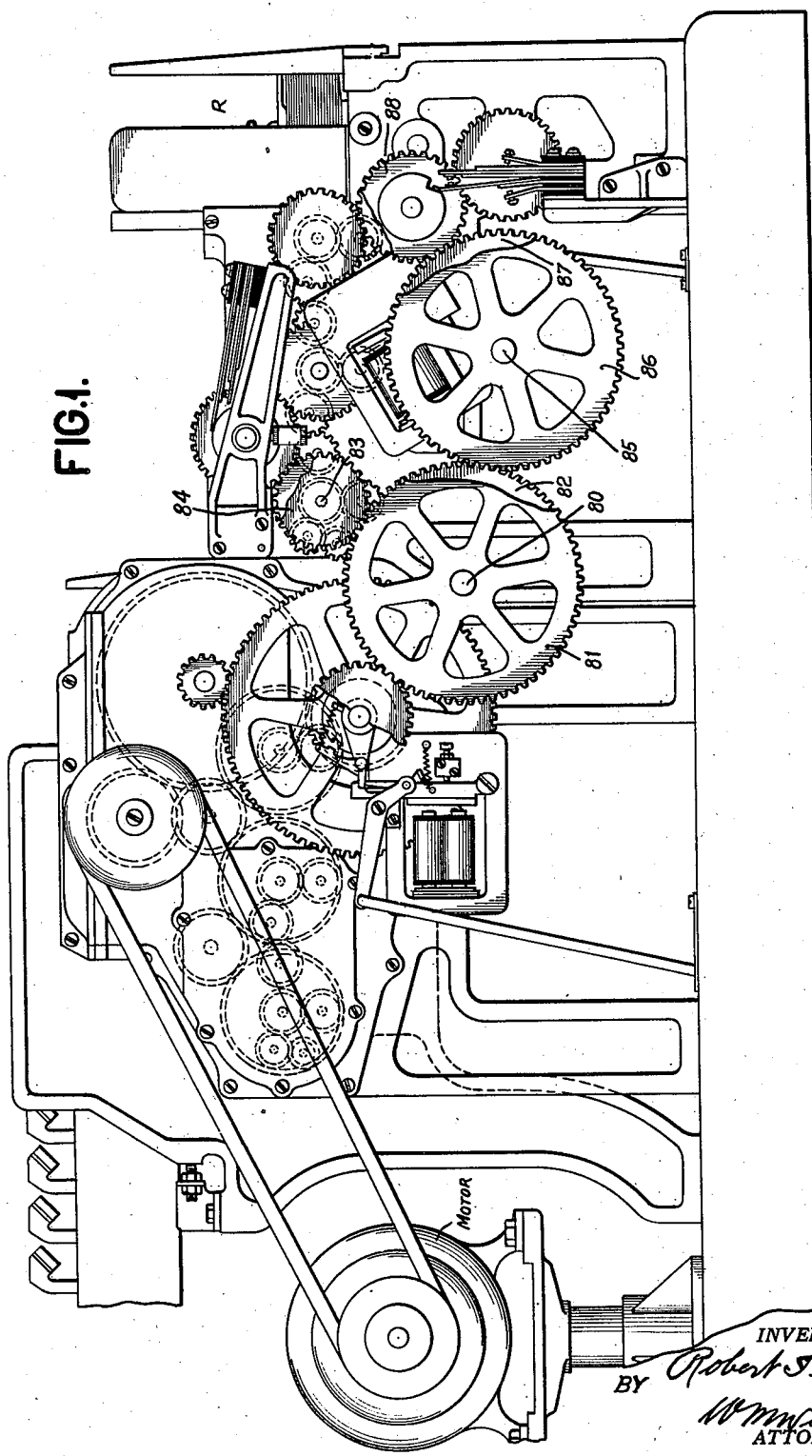
Fig. 1 is a side elevation view of the machine.

Referring to Fig. 1 and Fig. 3, the two side frames 72 and 73 are shown on either side of the original frames 74 and 75. The gear housing 76 is fastened to side frame 73. In Fig. 4 the gear 77, which is fastened to the pulley shaft, now drives gear 78 which is fastened to shaft 79 with a 1 to 1 ratio. Shaft 79 is the eccentric shaft (Figs. 2 and 6) which drives the bail 56 up and down. In Figs. 1 and 3 shaft 80 was lengthened. The gears 81 and 82 are mounted on this shaft 80. Gear 84 which is mounted on shaft 83 meshes with gear 81. On shaft 85 two equal toothed idler gears 86 and 87 are mounted. Gear 86 is driven by gear 82 and gear 87 drives gear 88. The feed roll shaft 89 (Figs. 2, 3, 4, and 10) now extends through side frame 72 and has fastened to its end the gear 90. Gear 90 (see Figs. 5 and 10) drives through the idler gear 91 to the gear 92 fastened to the shaft 93, with a ratio such that shaft 93 makes one complete revolution per machine cycle. Gear 90 also drives through idler gear 94 to the gear 95 which is fastened to feed roll shaft 96 with a 1 to 1 ratio. Gear 95 drives through the idler gear 97 to the gear 98 which is fastened to feed roll shaft 99 with a 1 to 1 ratio. Fig. 10 shows feed roll shafts 100 and 101, which have been shortened to clear the type bars 31, terminating in the feed rolls 102 and 103. Feed roll shafts 96 and 99 on the opposite side of the machine terminate in feed rolls 104 and 105 respectively.

When printing a zero at "13" index time in the cycle, it is necessary to prevent the punches from going down and thereby nicking the edge of the card. To accomplish this, two bails 106 and 107 (see Fig. 2) are provided which operate through holes 108 in the side frames 74 and 75 (see Fig. 3) Shortly before "13" index time in the cycle (see Fig. 21) these bails move to the right. The upper bail 106 acts to rock the pieces 53 out of engagement with the punches 54 and the lower bail 107 moves inwards to lock the punches 54. When the slides 45 are moved down to print zero, the punches 54 are not carried down.

As previously mentioned, shaft 93 (see Fig. 5) makes one revolution per cycle. From Fig. 10, it can be seen that this shaft 93 extends through the four side frames 72, 73, 74, 75. Mounted near each end of this shaft 93 are four cams and their followers which operate the various bails added to this machine.

The punch disabling cams 109 (see Fig. 12) act near the end of the machine cycle to rock clockwise, via cam rollers 110, the arms 111 against the action of springs 112. Arms 111 pivot on the studs 113 which are fastened to the side frames 74 and 75.

The zone bail cams 114 (see Figs. 10 and 13) are also mounted on shaft 93. The zone bail 41 extends through the side frames 74 and 75 in region of the holes 115. These holes are so shaped as to act as bearings for bail 41 in its horizontal reciprocating motion. A roller 116 mounted on stud 117 at each end of the bail 41 is embraced by the bifurcated ends of the arms 118 which are loosely mounted on shaft 119. A roller 120 on each arm 118 cooperates with cam 114. Timing of this cam 114 is shown in Fig. 21. A spring 121 acts to keep cam roller 120 always in contact with cam 114.

The stop pawl restoring cams 122 (Figs. 10 and 14) are also fastened to shaft 93. The purpose of these cams is to latch up the stop pawls 44, to permit the type bars 31 to be zoned at the beginning of each cycle. The stop pawl restoring bail 123 (see Figs. 2 and 14) extends through holes 124 in side frames 74 and 75. Rotation of cams 122 in cooperation with cam rollers 125 and follower arms 126 cause the bail 123 to be rocked clockwise then counterclockwise on shaft 119. Timing of cams 122 is shown in Fig. 21. The springs 127 hold the cam rollers 125 against the cams 122.

The printing interposer cams 128 (see Figs. 10 and 15) are also fastened to the shaft 93. The printing interposer bail assembly 129 which is made up of parts 35 and 36 (see Fig. 6) is adapted for horizontal reciprocating motion (see Fig. 15) in the slots 130 in the side frames 74 and 75. Referring to Fig. 10, the blocks 131 secured to the bail 129 by the screws 132 serve to position the bail 129 so that the printing interposers 37 are in line with the type bars 31. Studs 133 (see Fig. 15), one in each end of bail 129 are connected by the links 134 to the arms 135 which are pivoted on shaft 119. Cam rollers 136 on the arms 135 cooperate with the cams 128 which act to position the printing interposer bail 129 in accordance with the timing chart (Fig. 21). The springs 137 act to hold the rollers 136 against the cams 128.

A type ribbon 33 (see Fig. 6) of the conventional style is passed over the platen 34 from supply spool 138 to the storage spool 139, the respective spools being supported upon shafts 140 and 141. The ribbon 33, in this instance, would have a width equal to the length of the record card. With the ribbon and platen arrangement shown, printing will be effected upon the underside of the card.

Figs. 7, 8, and 9 show the proposed construction of the type bars 31. A U-shaped piece of metal 142 forms the type casing. Cross pieces 143 are provided at intervals along the top of the casing 142. These cross pieces 143 strengthen the casing 142 as well as separate the type which is made in the form of the shank 144 with an integral enlarged end 145. The character is formed on the bottom of end 145. Each shank 144 is a sliding fit in a hole 146 at the bottom of the casing 142. The assembly of such a type bar might be:

(1) Insert type shank 144 through the hole 146 in the casing 142, (2) Place compression spring 147 in position, (3) Force rectangular metal tubing 148 over the shank 144, (4) Spot weld the shank 144 to the tubing 148. A tail 149 of the type bar 31 is a piece of metal fitted inside the casing 142 and suitably spot welded.

Referring to Fig. 20, the various circuits constituting the wiring diagram of the machine can be distinguished. In addition to interpretive reproducing and printing operations, the machine is also provided with circuit connections for accomplishing class selection, field selection, and field elimination. Regardless of the type of work or function which the machine performs, whenever perforations of the record card occur, interpretive printing of the record card is performed simultaneously, both of these operations always being under the control of the pattern card.

For interpretively reproducing and printing current is supplied to the machine through line switch 150. It is assumed that cards are in both the sensing magazine R (pattern cards) and in the punch-print magazine P (blank cards) so that the RHL and PHL contacts are closed and relays 153 and 154 are energized. Upon depressing the "start key," a circuit will be completed from one side of the line through the contacts of the "stop key," the transferred relay points 154—B, the transferred relay points 153—B, the contacts of the "start key," the coil of the relay 155, the coil of the relay MRM, to the other side of the line. The driving motor will now be energized through the relay points MRC. The relays MRM and 155 will now remain energized through the relay points 155—A and the points controlled by the circuit breaker C—1. When C—2 makes relay points 155—B will be closed and a circuit will be completed through C—2, 155—B, 151—B, PCM to energize PCM, and through C—2, 155—B, 152—C, RCM to energize RCM. These magnets control the feeding clutches of the punch-print magazine and the sensing magazine respectively, and in the first cycle a card will be fed out of each magazine in synchronism and the contacts RCL—1 and DCL will be closed, thereby picking up relays 151 and 152. The holding circuit for relays MRM and 155 will now be from one side of the line, "stop key," relay points 154—A, 153—A, 152—A, 151—A, 155—A, relay 155, relay MRM, other side of line. In the second cycle the pattern card will be fed past the sensing brushes and the card to be punched and printed (blank card) will be fed past the die.

Assume the plug hubs 171—174 plugged to plug hubs 175—178 respectively. Assume further that one column only, the column associated with plug hub 175, be considered, an impulse at "12" or "11," index time, will energize the punch magnet and relay 161. From the timing chart (Fig. 21), it can be seen that energizing relay 161 at the "12" or "11" index time would merely operate the 161—A points. At "zero" time, however, the 158—A points transfer as P—1 is made and both the relay 160 and the punch magnet would be energized. Relay 160 would be held energized through its points 160—A and P—3. Later in the same cycle if another hole is to be punched in combination with the "zero" hole, relay 161 would be energized in conjunction with the punch magnet and relay 160 would be deenergized. If the column contained only a "zero" the 160—B points would allow an impulse to get through to the punch magnet at "13" index time when 159—A points transfer and a "zero" would be printed.

Class selection, field section, and field elimination are accomplished in the usual manner by means of the class selectors and use of the "X" brush in the sensing unit. The sensing of an "X" causes relay 156 to be energized and held through 156—A points and R—2. The 156—B points energize relay 157 when R—3 makes on the next cycle and the relay 157 is held energized through relay points 157—A and R—4 for the duration of the cycle. Relay points 157—B accomplish the selection or elimination through plugging between plug hubs 171—174 and plug hubs 175—178.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a punching and printing mechanism wherein a record card is reproduced from and printed under control of a pattern card, a line of devices for sensing the pattern card, a line of perforating devices, a line of printing devices comprising type bars, a printing interposer for each said type bar, a ribbon, a platen, means for feeding a pattern card past the sensing devices and a record card past the perforating and printing devices in synchronism with intermittent motion, said record card progressing along and under the type bar and over the ribbon and platen, means for advancing the said printing interposers in synchronism with the record card, the said interposers progressing along and above the said type bars, type elements independently operative and so disposed along the said type bars as to progressively come under the said interposers as they advance, and means under control of the sensing devices for operating the perforating devices and the printing devices upon each intermittent pause of the card feeding, the said means being operative respecting the printing devices through the said printing interposers to operate said elements to print all characters sensed from the pattern card in an even and predetermined line on the record card.

2. In a machine operating under control of pattern cards having code indicia representing characters by their index point positions, to produce record cards having corresponding code indicia and interpretive printed characters; cyclically operating means for feeding the pattern cards and record card blanks in synchronism; means for sensing the code indicia of the pattern cards; means operating under control of said sensing means to produce code indicia at selected index points of the record card blanks, at differential times determined by the positions of the code indicia of the pattern cards; printing means comprising a type bar adjacent the path of feed of the record card blanks, said type bar having a set of individually movable type arranged in a row parallel to the line of feed of the record card blanks; an interposer movable along said row of type and means for moving the same coordinately with the feed of the record card blank; and means controlled by said sensing means to actuate said interposer and the type momentarily aligned therewith, to print a character interpreting the indicia sensed.

3. In a machine for producing and interpreting a set of perforated cards under control of a set of pattern cards; a line of sensing brushes; a line of punches; a line of type bars each having a set of individually movable type in a row transverse to said line of type bars; a line of type bar interposers operative upon the rows of type carried by the respective type bars; a line of actuating slides common to the punches and type bar interposers; means for feeding cards from the set of pattern cards, transverse to the line of sensing brushes; Geneva gear mechanism for feeding the record cards in synchronism with the pattern cards, with intermittent movement transverse to the lines of punches and type bars; means to move said interposers coordinately with, and parallel to, the feed of the record cards; a ribbon, a platen, said ribbon and platen cooperating with said type to print on said record cards; interposer pawls connected to said actuating slides and selected by magnets controlled by said sensing brushes; an actuator for operating selected pawls and connected slides, said slides transmitting such action to operate said punches and type bar interposers, to cause perforation and printing of the record card corresponding to the pattern cards; and an eccentric on said Geneva gear mechanism for operating said actuator during each intermittent pause in card feed.

4. A machine as described in claim 2, wherein the number of type on said type bar is a multiple of the number of index points along the direction of feed of a card, and means are provided to shift said type bar parallel to the row of type, to bring different groups of said type selectively to operative position.

5. A machine as described in claim 2, wherein the number of type on said type bar is a multiple of the number of index points along the direction of feed of a card, and means are provided to shift said type bar parallel to the row of type, to bring different groups of said type selectively to operative position; said last means including yieldingly acting means for moving said type bar in synchronism with the movement of said interposer, during the sensing of the first index points of the pattern card; zoning means for arresting said type bar; and means responsive to the sensing of a code character at one of the first index points, for operating said zoning means.

6. A machine as described in claim 2, wherein the number of type on said type bar is a multiple of the number of index points along the direction of feed of a card, and means are provided to shift said type bar parallel to the row of type, to bring different groups of said type selectively to operative position; said last means including yieldingly acting means for moving said type bar in synchronism with the movement of said interposer, during the sensing of the first index points of the pattern card; zoning means for arresting said type bar; means responsive to the sensing of indicia at one of said first index points, for operating said zoning means; said interposer being positioned out of alignment with all said type during the sensing of said first index points, to prevent printing at that time; preparatory means set up by the sensing of a code character at one of said first index points, and means acting regularly at a later time in each cycle, and cooperating with said preparatory means if the latter has been set up, to operate said printing means.

7. In a machine for applying selected characters to a record sheet, a row of character members, means for feeding the record sheet along said row of character members, striking means operable upon a single character member at a time, means to move said striking means along said row of character members in synchronism with the feed of the record sheet, differential control means to cause said striking means to operate at variable selected points in its travel, and a platen located on the opposite side of the card from said row of character members and coextensive with said row.

8. In an interpreting machine, a type holder having a row of independently operable type members thereon, a platen opposite said type members having a surface coextensive with the row of type members and spaced from the latter to form a card feeding path therebetween means for feeding record cards along said path parallel to the row of type members, striking means operable upon a single type member at a time, means to move said striking means along said row of type members in synchronism with the feed of record cards, and differential control means to cause said striking means to operate at variable selected points in its travel, whereby selected characters are printed at the same position on each successive card.

9. A machine as described in claim 8, wherein the number of type members on said type holder is a multiple of the number of differentially selectable points in the travel of said striking means, and said type holder is movable as a whole to place different groups of type members at said differentially selectable points.

10. A machine as described in claim 8, wherein said differential control means comprises a pattern card feeding and sensing means, operating synchronously with the record card feeding means.

11. In a machine operating under control of pattern cards having code indicia representing characters by their index point positions, to produce record cards having corresponding code indicia and interpretative printed characters; sensing means, code indicia producing means, cyclically operating means for feeding pattern cards and record cards past said sensing means and said code indicia producing means, respectively, so that the index point positions of pattern cards are sensed in sequence as said cards are fed; means controlled by said sensing means to operate said code indicia producing means at differential times, to produce code indicia at selected index point positions of the record card blanks; printing means including character members distributed along the direction of feed of the record card blanks; striking means operable upon said character members individually; means to move said striking means over said character members, in synchronism with the feed of the record cards; and differential control means operated under control of said sensing means to cause said striking means to strike particular character members at differential times, to print characters interpreting the code indicia produced on the record card blanks during the same cycle.

12. In a reproducing and interpreting machine operating under control of pattern cards having columns of index points, in each column of which, characters are represented by code indicia at one or more index points; cyclically operating means for feeding pattern cards and record card blanks in synchronism; means for sensing the index point positions of the columns of the pattern cards sequentially as the cards are fed; code character producing means and printing means, each comprising a set of devices operative, respectively, in the different columns of the record card blanks in the course of the feed of the latter; a set of actuating devices each pertaining to one of the code character producing devices and the corresponding printing device; means controlled by said sensing means to activate one of said actuating devices each time a code character is sensed in the corresponding column of a pattern card, each of said code character producing devices being adapted to be operated by its actuating device each time the latter is operated under control of said sensing means, to produce a code character at the index point position of the record card corresponding to the index point position of the pattern card at which a code character was sensed; each of said printing devices comprising a row of printing elements parallel to the direction of feed of the record card blanks, and striking means operated by said actuating means and moving in synchronism with the feed of the record card blanks lengthwise of the row of printing elements, so as to be positioned to coact, upon one operation of said actuating means, with that one of said printing elements which prints a character interpreting the particular code character produced in the same column of the same record card.

13. An interpreting punch as described in claim 12, having zone shifting means operable to shift the row of printing elements in a direction parallel to the row.

14. An interpreting punch as described in claim 12, having zone shifting means operable to shift the row of printing elements in a direction parallel to the row; and means responsive to the sensing of a code character at one index point, and acting in conjunction with means operative in each cycle upon conclusion of the sensing of all the index points, to cause operation of the corresponding printing device to print a particular character.

15. In an interpreting punch, a punching element, a row of printing elements aligned therewith, means for feeding cards past said elements in a direction parallel to the row of printing elements, striking means adapted to coact with said printing elements individually, means for moving said striking means parallel to the row of printing elements, in synchronism with the feed of the cards, and means for actuating said punch element and said striking means simultaneously at variable times during the feed of successive cards, to perforate the cards in variable index point positions and to print various interpreting characters in the same position on all of the cards.

16. In an interpreting punch, a punching element, a row of printing elements aligned therewith, means for feeding cards past said elements in a direction parallel to the row of printing elements, striking means adapted to coact with said printing elements individually, means for moving said striking means parallel to the row of printing elements, in synchronism with the feed of the cards, said striking means being in non-coacting position during part of its movement, a common actuating means for said punch element and said striking means, means for operating said common actauting means at variable times during successive card feeds, once while said striking means is in non-coacting position and again while said striking means is in coacting position, to perforate the cards twice in variable index point positions and to print single interpreting characters in the same position on all cards.

17. An interpreting punch as described in claim 16, having zone shifting means operable while said striking means is in non-coacting position, to shift the row of printing elements in a direction parallel to the row.

ROBERT I. ROTH.